Dec. 24, 1946. R. E. MARINE 2,413,025
VEHICLE LOCK
Filed Jan. 9, 1941 3 Sheets-Sheet 2
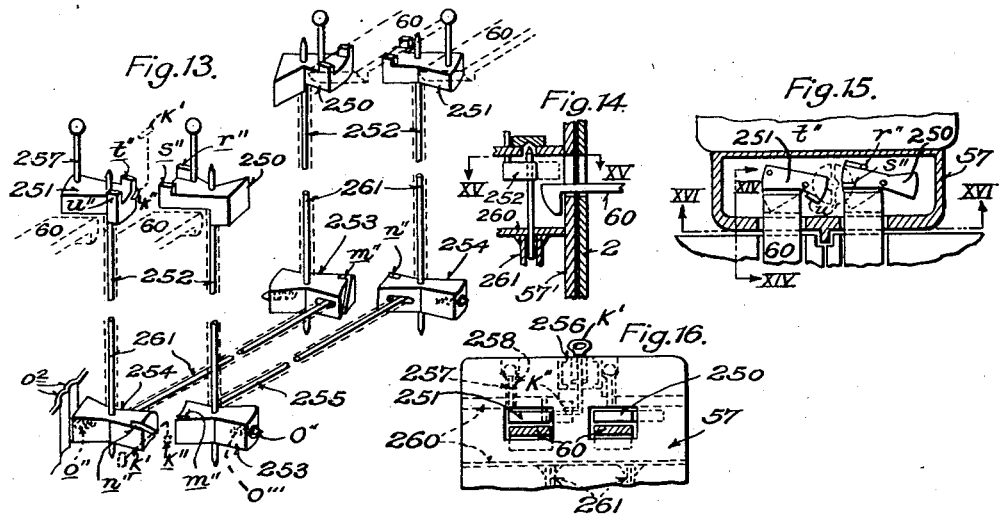
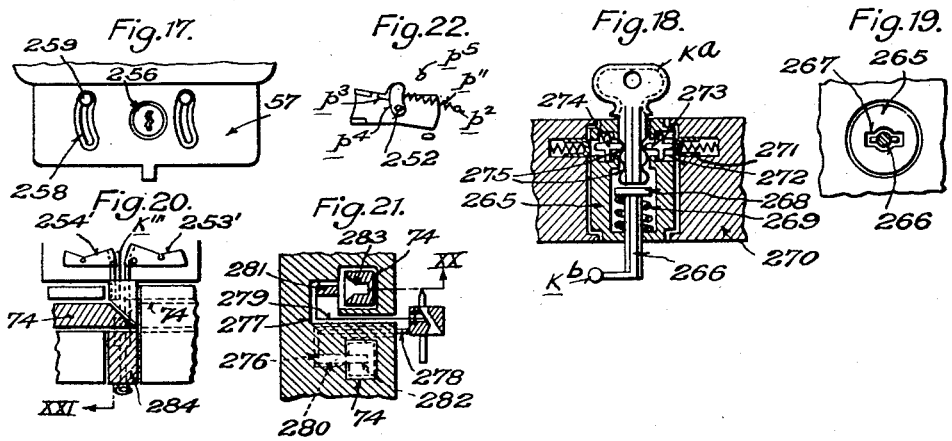
Inventor
Richard E Marine

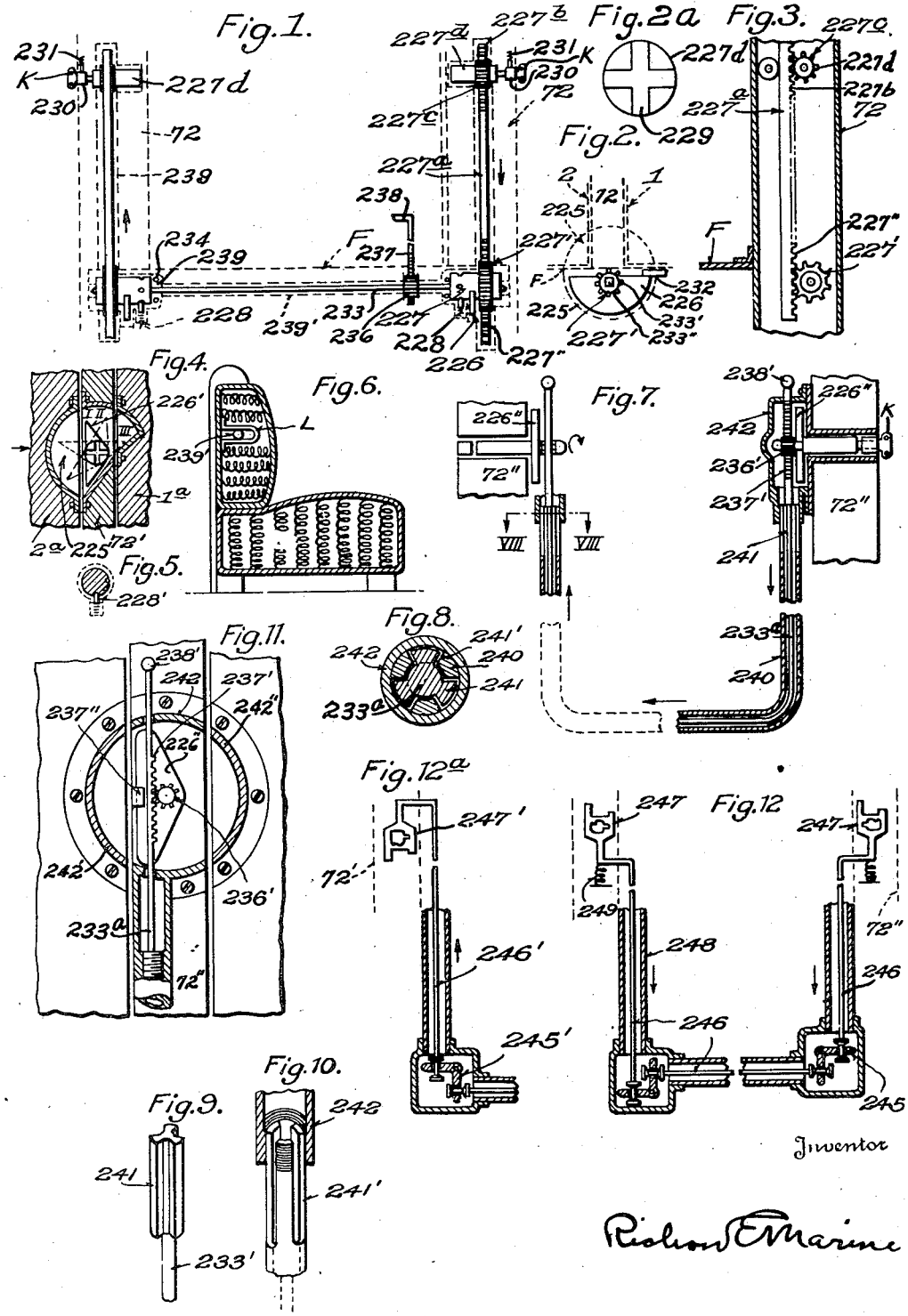

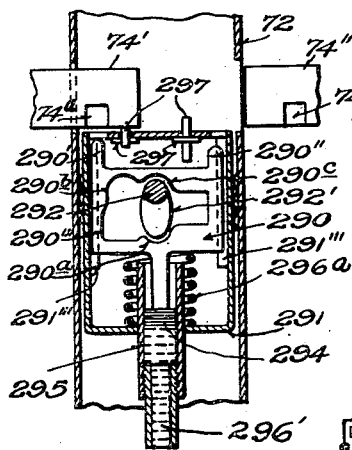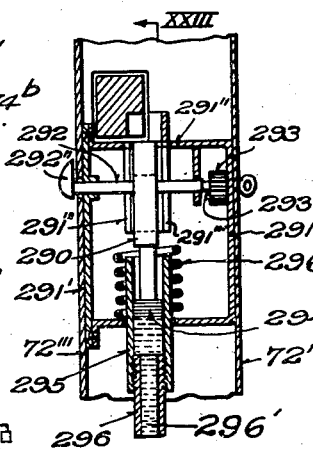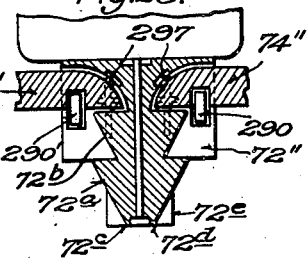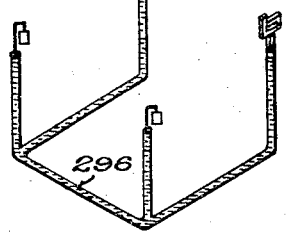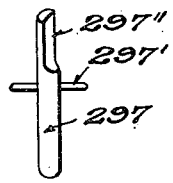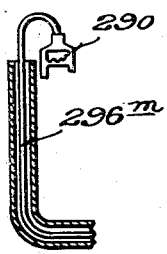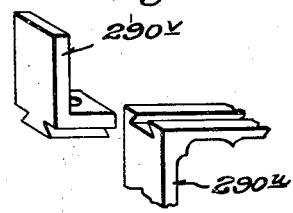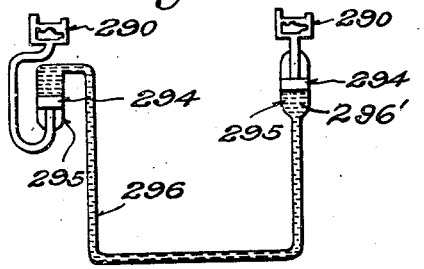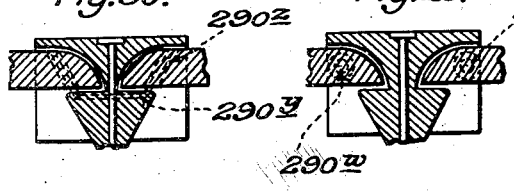

UNITED STATES PATENT OFFICE 2,413,025

VEHICLE LOCK

Richard E. Marine, Pittsburgh, Pa.

Application January 9, 1941, Serial No. 373,846

46 Claims. (Cl. 70—264)

My invention relates to locking systems primarily designed for use in automobiles, or analogous uses.

This application is a continuation in part of my application Serial No. 625,937, filed July 29, 1932, now Patent No. 2,260,326, granted October 28, 1941.

The automobile body is subject to twisting strains, vibration, and shocks, and any locking system used therein must be rugged, while, because of the limited space available and the restrictions as to location, it must also be small and adapted to accommodate itself to its exacting environment. It must also be a system of small inertia and delicate, though positive and certain in its operation, because the ordinary automobile key which is continuously carried by its owner with many others in every-day use, must necessarily be small and incapable of operating a system of large inertia, such as may be operated by the larger keys and levers used in doors of stationary and similar structures.

My invention contemplates a locking system wherein both doors on the same side of the vehicle are simultaneously locked by a single key or similar operation but in which each door may be provided with the usual latch mechanism located on the door itself and operated by the door handle so that, when unlocked, each door may be opened and closed by the operation of the usual handle.

My invention further contemplates a locking system whereby the doors on the opposite sides of the vehicle may be simultaneously locked from a single point by a single key or similar operation, whether there be a single door on each side, or two or more doors on each side. Thus where prior systems usually required, for a four door car, four separate operations and the passing of the operator from one side to the other, frequently in danger of traffic, to completely lock the car, in many cases forgetting to lock one of the doors, my system enables the car to be completely locked by a single operation and from a single point out of range of the traffic and with no danger of forgetting a door.

Where two doors are employed on each side, my invention effects the simultaneous locking and unlocking of both rear doors, only, if desired, the front doors remaining unlocked, as where it is wished to protect children or baggage in the rear portion of the car; or, optionally, my invention effects the simultaneous locking and unlocking of the front doors, alone, or of all four doors, from a single key operation.

My invention also contemplates the locking or unlocking of the doors, optionally, from either side of the vehicle, exteriorly or interiorly, regardless of the point at which the prior locking or unlocking was performed.

Inasmuch as my system is necessarily extensive and difficult to operate with the usual small key, or the like, unless designed with small inertia, my invention further contemplates the reduction of the inertia of the system, as by constructing and locating the parts so that the motion imparted to them by the key, or the like, will not be opposed to the force of gravity, or by balancing one part against the other so that the resultant effect of gravity is substantially zero, or by the use of springs to counteract the influence of gravity. I further eliminate, as far as practicable, friction between relatively moving parts.

Inasmuch as such a system requires delicate adjustment and balance which for successful operation must be maintained at all times, notwithstanding the stresses and strains incident to the exacting conditions of road travel, accident, etc., my invention further contemplates locating the system in a protecting casing, such as a tubular frame in which the parts are assembled and mounted, the frame being preferably rigidly connected to the car body primarily at its ends, containing or adjacent to the locks. Such a system then becomes a self-contained unit which may be set up and adjusted at the factory and easily attached to the car body in the assembly line and is free from the ordinary stresses, strains, and vibrations of the car body.

My invention further contemplates the construction of a self-contained locking system of the character indicated which may be simply attached to existing cars without substantial modification of the latter.

Where the locking mechanism becomes far removed from the point of insertion of the key, in order that the key may not be of undue size and length, rendering it impracticable for its purpose, my invention further contemplates a "key extension" or key part which permanently remains in the lock but is only actuable by the insertion and operation of the usual key.

My invention further contemplates the provision of means to prevent locking any of the doors if all of the doors are not closed—thus insuring against inadvertently leaving a door open when the others are locked and also avoiding possible damage to the locking system by attempting to close a door after locking the other doors.

An efficient form which my invention may take is a simple detent means provided in or on the intermediate body post on each side of the vehicle adapted to be interconnected for concurrent operation to engage recesses in the normal latch members of the door to prevent retraction of such latch members. This system can be made essentially of three parts, two detent plates one for each post and appropriate interconnecting means such as a tube enclosed wire connected at its ends to the respective plates or a tube containing fluids with pistons at its ends connected to the respective plates. Such systems are exceedingly light, offer little resistance to key operation and are exceedingly cheap to install. Moreover they are located in a part of the car not occupied by other mechanism and are highly efficient.

A special type of my locking mechanisms for locking the doors to the bottom frame of the car body operates to prevent premature opening of the doors in case of accident or undue strain which might wrench the usual lock or latch from the center of the body post, its customary location. It also operates to prevent the prying of the post from the lock by a thief, which is a common occurrence and is much more effective than the ordinary handle lock in repelling his attempts to break into the car. Its location also removes the danger of soiling the clothing of passengers, with any grease that may be placed in the lock. This system is an improvement on a similar system disclosed and claimed in my said patent. In that disclosure the key socket is located at the floor level. The present disclosure makes provision for its location at the usual height on the center body post where the car operator expects to find it.

My invention further consists in such other new and useful improvements, and has for further objects such other operative advantages and results, as obtain in the constructions, and their equivalents, hereinafter described or claimed.

In the accompanying drawings, forming a part of this specification, and showing for purposes of exemplification preferred forms and manners in which the invention may be embodied and practiced but without limiting the claimed invention to such instance or instances:

Fig. 1 is a side view of one form of my locking system showing the positions of adjacent parts of the car bottom, doors, intermediate body posts and lock casing in dotted lines; Fig. 2 is a fragmentary end view of the lower part of Fig. 1; Fig. 2$^a$ is an end view of the key operated barrel for operating the locking system; and Fig. 3 is an end view, partly in section, of the system shown in Fig. 1.

Fig. 4 shows a slightly modified form of the same locking system adapted for use on the conventional body post, intermediate of the doors; and Fig. 5 shows the detent arrangement for the system of Fig. 4, while Fig. 6 shows, in vertical section, a tube for carrying the interconnecting shaft between locks on opposite sides of the car body, passing through an elongated slot in the seat-back of an adjustable front seat.

Fig. 7 shows, partly in section, a modified system in which the locks on opposite sides are elevated above the floor and are connected down the sides and across the floor or under the seat; Fig. 8 is a cross section on line VIII—VIII of Fig. 7, and Figs. 9, 10, and 11 show details of parts thereof.

Fig. 12 shows a further modification in which springs are employed to neutralize the effects of gravity; and Fig. 12$^a$ shows a modification of the system of Fig. 12.

Fig. 13 is a diagrammatic perspective view of a modified form of balanced locking system; Fig. 14 is a section showing a detail on the line XIV—XIV of Fig. 15; Fig. 15 is a section showing a detail on the line XV—XV of Fig. 14; Fig. 16 is a section on the line XVI—XVI of Fig. 15 showing the intermediate body post between the doors, as terminating at the level of the top of the car sides just above the locks; and Fig. 17 is a top plan view of said post.

Fig. 18 is a section of a key barrel, showing the principle of my key extension; and Fig. 19 is a bottom plan view, partly in section, of the same.

Fig. 20 is a fragmentary horizontal section on the line X—X of Fig. 21 showing the locking system of Fig. 13 adapted to the conventional door latch; Fig. 21 is a fragmentary vertical section on line XXI of Fig. 20; and Fig. 22 shows a modified form of biasing device for the locking elements of Fig. 13.

Fig. 23 shows a longitudinal vertical section, taken on the line XXIII of Fig. 24, Fig. 24 a transverse vertical section, and Fig. 25 a horizontal section, of a further modified form of my invention employing a fluid for transmitting motion from one lock to another to obtain their synchronous operation; Fig. 26 shows one expedient in such a system for preventing operation of the locks until all doors are closed; and Fig. 27 shows diagrammatically the fluid transmission system, as a whole; Fig. 27$^a$ shows a system similar to Fig. 27, but actuated by tube enclosed wire for connecting the locking elements on different sides of the door and Fig. 27$^b$ shows a fluid system similar to Fig. 27 but adapted to operate locks on two doors on each side whose face edges are not juxtaposed.

Fig. 28 shows means for adjusting the lock member of this system to various widths of posts and Figs. 29 and 30 show modified forms of locking members adapted for use in this system.

Referring to the drawings, there is shown in Figs. 1, 2 and 3 a circular pocket 225 formed in part in the lower adjacent corners of the free ends of the doors 1, 2, in part in the intermediate post 72 and in part in the bottom F of the car immediately beneath said doors, and extending longitudinally of the car. In this pocket is located the locking element which may conveniently be a semi-circular plate or disk 226 rotatably mounted on a barrel shaft 227 provided with suitable detents 228 adapted to yieldingly hold the barrel shaft in any one of a plurality of positions, shown as four in number. On the outer ends of the barrel shaft 227 are provided pinion teeth 227' engaging similar teeth 227'' on the sliding rack 227$^a$ provided, also, at its upper end with similar teeth 227$^b$ engaging teeth 227$^c$ on a barrel 227$^d$. In the outer face of the barrel 227$^d$ are shown two kerfs 229 (Fig. 2$^a$) at right angles to each other. In front of and in rotative alignment with the barrel 227$^d$ is preferably a key barrel 230 of convenient type operable only by a key of proper design and provided with detents 231 adapted to yieldingly hold said key barrel in one of several positions, corresponding to those of the barrel 227$^d$ which in turn correspond to those of barrel 227 and semi-circular disk 226, thereon. If desired, combined detents and locking elements as subsequently disclosed herein (Fig. 18), or other secret locking means, may be employed for the key barrel 230. The proper key K inserted in the key barrel 230 extends therethrough and across the gap between said barrel and the barrel 227ᵈ and into the kerf 229 of the latter that happens to be aligned therewith. Introducing this key unlocks the key barrel 230 permitting the key and key barrel to turn. When the semi-circular disk 226 is in the position shown in Fig. 2 the doors are unlocked. If the key be turned clockwise one quadrant or 90°, the rear door only is locked. If it be turned two quadrants or 180°, i. e. until its motion is arrested by the stop 232, both the front and rear doors are locked. A similar locking mechanism may be provided for the doors on the opposite sides of the car and since the barrel shafts 227 on the respective sides are in rotative alignment with each other, they may be made parts of a single integral shaft 233, preferably reduced between its ends and provided with ball-bearings 234 to facilitate turning. With this arrangement it becomes possible to lock both rear doors, only, or, if desired, all four doors by the same operation and from either side of the car. The relative positions of the rack and pinions on one side may be reversed, if desired, with reference to their positions on the other side in order to retain the same clockwise rotation of the key on each side for the locking operation. In order to effect automatic adjustment of the position of the locking disks 226 with respect to the pockets 225 for variations in the distance between the respective pockets, at least one of the barrel shaft members 227 is preferably slidingly but non-rotatably mounted on the shaft 233, in which one end 233' of the shaft is shown as squared and the corresponding barrel shaft 227 is shown as provided with a concentric squared opening 233" through which the squared end of the shaft freely but non-rotatably passes. In order that the locking mechanism may be operable from the inside without the necessity of using a key, the shaft 233 is preferably provided at an appropirate point inside the car with a pinion 236 capable of being actuated by a sliding rack 237 having an operating handle 238 located at any point convenient to the occupant, or a plurality of such operating racks and pinions located at various convenient points in the car may be provided. Preferably, as shown in the dotted lines, the locking system is enclosed in end casings 239 rigidly connected together by an intermediate tube or casing 239' conveniently located in or on the floor. This casing may be extended continuously upward on each side to enclose the rack and its barrel adjacent the key barrel. The whole casing structure serves to protect the locking system from all deleterious influences, strains, etc. In this connection it is to be observed that the shaft carries no substantial part of the strain to which the door locks may be subjected, this being borne for the most part as a shearing strain by the semi-circular disks 226 and pockets 225.

In Fig. 4 my improved locking system is shown applied to a car provided with a panel or post 72' between the free edges of the front and rear doors 1ᵃ and 2ᵃ. Here the pocket 225' is located in part in the two doors and in part in the panel and the lock member 226' may be made to occupy position I in which both doors are unlocked, the position II in which both rear doors only are locked, or position III in which all doors are locked. The spring detent arrangement for such a system is shown at 228' in Fig. 5. In this case the shaft may be raised above the floor being conveniently passed through the back or bottom of the front seat. In case the seat is adjustable its back or bottom may be provided with an elongated slot L, Fig. 6, for the accommodation of the tube or casing 239' through which passes the lock shaft connecting the parts of the locking system on opposite sides of the car.

In Figs. 7 to 11 is shown a construction whereby the locking members 226" on opposite sides of the car body may be interconnected by means passing down the sides of, or through, the body posts 72" and across, through, or around the bottom of the car, in fact, in any convenient, out of the way position. This construction is shown as comprising a pinion 236' engaging a rack 237', having a manually operable knob 238' at its upper end to permit operation from the inside of the car, the rack 237' being backed by an aligning member 237" and integrally attached to a transmitting member 233ᵃ, such as a spring brass wire, which while sufficiently flexible to slide around the bends in the tubular casing 240 without material friction, is sufficiently rigid longitudinally, when sliding within the casing, to transmit any force required for performing the locking and unlocking operation. In order to prevent the ends of the transmitting member 233ᵃ from flexing when they move out of the tubular casing 240, these ends have integrally attached thereto fins 241, which freely ride in corresponding slots 241' in the upper end of the tubular casing. It is obvious that the fin and slot arrangement may be replaced by a tongue and groove arrangement if it is desired to keep the upper ends of the tubular casing continuous on its outer circumference for connection, as by screw threads, to the lock casing 242. This casing and its associated door parts 242' and 242" (Fig. 11) are shown so constructed as to be readily attachable to existing body posts 72" and doors 1 and 2, without substantial alteration therein. It is obvious, however, that the system may be built within the body posts, doors and bottom.

In Figs. 12 to 30 are shown modifications of locking systems which differ from the preceding systems in that no special locking elements are employed between the doors and body posts but rather the locking of the doors is effected by means which prevent withdrawal of the normal door latches from their engagement with the body posts. Since in these systems the latch itself withstands the strain of any attempt to pry the door loose, it is only necessary to employ a very light element to prevent its withdrawal, and hence a very light locking system comprising locking pins, or their equivalents, on each side of the car and means for interconnecting them, all easily operated by a small pocket key, or other secret lock means, is required.

In Fig. 12 is shown a system of levers 245 and rods 246 for interconnecting locking members 247, of a type more fully described in connection with Fig. 23, these members being located in body posts 72". For clearness of illustration, these locking members 247 are diagrammatically shown in Figs. 12, 12ᵃ, 27 and 27ᵃ turned 90° from their normal positions. The entire system is delicately mounted in casing 248 and springs 249 are provided which are designed to neutralize the weight of the vertical rods 246, being placed under greater tension when these rods are lowered so as to give an initial impetus to them when they are being raised. If one of the locking members 247 be designed to operate in reverse direction to the other, the levers 245 may be arranged in an obvious manner to cause the vertical rods 246 to move in opposite directions and thereby balance each other.

In Fig. 12ª the bell crank lever 245' at the left is shown as reversed from its position in Fig. 12 in order to lift the vertical rod 246' on that side while the rod 246 on the right is being lowered, thus balancing the system against resultant lifting forces required to be overcome by the key. This necessitates inverting the position of the locking member 247' and its engagement with recesses provided in the upper side of the latches on the left side of the car, rather than with recesses in the lower side of the latches, as on the right side of the car. The springs 249, if desired, may be dipensed with.

In Figs. 13 to 19 there is provided a pivoted locking element 250 or 251 for each of the latches, adapted to assume the unlocked position shown in full lines in Figs. 13, 14, and 15 or the locking position over the latch, thereby preventing raising of the latches by the door handles to release them from the locking plate 57', when the locking elements are in the positions shown in dotted lines in Figs. 14 and 15. Each locking element 250, 251 is preferably exactly balanced on its vertical shaft 252, pivotally supported at top and bottom in the post 57 and each shaft is provided at its lower end and conveniently in the floor of the car with an actuating element 253 or 254 also preferably exactly balanced on the shaft. The actuating elements 253 and 254 have their inner ends adjacent each other, separated by a space just sufficient for their operation by a single key inserted between them as shown diagrammatically in dotted lines at K' in Fig. 13. The faces of the element 253, 254 are each shown as provided with grooves $m''$, $n''$ respectively of a size to accommodate the end K'' of the key, said grooves each sloping from the top outer corners of its corresponding face to the bottom inner corner thereof. In the unlocked position, the lower inner corner of the groove $n''$ lies in substantially the same vertical plane parallel to the longitudinal axis of the car as the top of the groove $m''$ as shown in Figs. 13 and 15. The actuating elements are shown as yieldingly held in unlocked or locked position, as the case may be, by the detents $o''$, yielding pressed outwardly by internal coil springs $o'''$ (shown in dotted lines in Fig. 13), into engagement with suitable stationary recesses $o^2$ (Fig. 13), or they may be biased either to locked or unlocked position by the arrangement shown in Fig. 22 in which a spring $p''$ is attached at one end to a fixed point $p^2$ and at the other end to a point $p^3$ on the actuating element, being carried around the shaft 252 by a rigid frame member $p^4$, stops to limit the throw of the element being provided at $p^5$, the spring passing through the deadpoint of the pivot substantially half way between the stops. The actuating elements 253 on one side of the car are connected by links 255 to the actuating elements 254 on the opposite side of the car, being freely pivoted therein at their ends.

To operate the system, assuming that the doors are unlocked and it is desired to lock them, the key K' is inserted until its end K'' lies adjacent the lower far end of the groove $n''$. It is then turned clockwise 180 degrees, its end K'' riding in the groove $n''$ and by cam action turning the shaft actuating element 254, and with it its shaft, to throw the locking element 251 over its corresponding latch 60 to lock the same against removal from its engagement with the locking plate 57' (dotted line position, Figs. 14 and 15). Simultaneously the corresponding link 255 will throw the locking element 250 on the opposite side of the car into locking position with reference to its latch 60, thus securely locking both rear doors. If the turning of the key be now continued still in clockwise direction its end K'' will first take into the top of the groove $m''$ and will then by cam action turn the actuating element 253 and with it its shaft to throw the locking element 250 into locking position over its latch 60. Simultaneously the corresponding link 255 will throw the locking element 251 on the opposite side of the car into locking position over its latch 60 and all doors of the car will be locked. To unlock them the reverse operation is performed—that is, the key is turned in anti-clockwise direction. Both front and rear doors may therefore be locked and unlocked in pairs from a single point on either side of the vehicle and by a single operation. Moreover, the rear doors may be left locked while the front are unlocked and vice versa. To this end it is desirable to construct the key barrel so that the key may be withdrawn or inserted and operated from either the 6 o'clock position or the 12 o'clock position.

There is also provided means for unlocking the door from the interior. For this purpose the locking elements 250 and 251 may be provided with upstanding projections or lugs $r''$, $s''$, and $t''$, $u''$ respectively, while a vertically disposed key barrel 256 as shown in Figs. 15, 16 and 17 is located immediately above and between them, in the top of the post 57. When the locking elements are in the unlocked position shown in Fig. 15, and the key is inserted with its end member K'' toward the bottom of the sheet and turned clockwise, it first engages the lug $t''$, throwing the locking member 251 into locking position to lock the rear doors, and if it is further desired to lock the front doors rotation clockwise is continued, the end member K'' engaging in turn the lug $s''$ and throwing the locking member 250 into locking position to lock the front doors. Anticlockwise rotation of the key causes its end member K'' to engage the lugs $r''$, $u''$ in sequence, the lugs $s''$, $t''$ having been moved out of its path in the locking operation.

It will be observed that the pivotal points of the locking members and the direction of inclination of the grooves in their faces have been specially so designed that clockwise rotation of the key will always effect a locking and anti-clockwise rotation and unlocking on both sides of the car, unless these conditions already exist, but it is obvious that the parts may be designed to modify this sequence of operations in any desired manner.

As an emergency expedient or an additional mode of operating, the locking members each may be provided with a rigid upstanding rod or post 257, operating in slots 258, and provided with knobs 259 by means of which each may be manually turned either to locking or unlocking position. It is understood that these several expedients may be provided if desired in each of the posts 57 on opposite sides of the car to render more convenient the locking and unlocking operations. Each of the adjacent pairs of locking and actuating elements are advantageously contained in a protecting casing 260 (Fig. 14), these casings being connected by tubular members 261 surrounding the respective inter-connecting shafts and links 252, 255. The entire system of connected casings and tubular members are preferably suspended or fixed at its upper end only, whereby the system is relieved of all body strains tending to throw it out of adjustment. The shafts are preferably pointed and mounted in well adjusted bearings to render key operation of the entire system easy and the balanced locking elements 250, 251 turn out of contact with the casings and latches and are designed to individually bear any pressure imposed upon them by the attempt of the latches 60 to lift, such attempts merely lifting the locking elements and their shafts until the former engage the tops of their casings.

As it is frequently necessary for the key actuating end member K" to extend inwardly some distance, for instance beneath a door as in Fig. 13, which may necessitate the use of an inconveniently long key or a folding or telescopic key, I have devised a special key barrel construction carrying permanently a key extension which is only rendered operative by the insertion of the proper key which itself may be made of the usual convenient length. This construction is shown in Figs. 18 and 19 wherein are shown the key barrel 265 provided non-rotatably with a flattened key extension shank 266, passing through a slot 267 in the bottom of the barrel, said shank having a head 268 and an actuating end member K$^b$. A spring 269 is provided between this head and the bottom of the barrel to normally retract the extension its full length into the barrel chamber. The casing 270 surrounding the barrel is provided with spring pressed plungers 271 normally taking into the openings 272 in the barrel and thereby locking the same against rotation. The barrel is provided in these openings with tumblers 273 suitably retained and guided therein as by pin and slot connection 274. When the proper key K$^a$ is fully inserted, the tumblers 273 are pressed outwardly just sufficiently to cause both their ends and the ends of the plungers 271 to be in alignment with the circumference of the barrel, thus permitting it to be turned by the key. The insertion of the key also forces the head 268 and shank 266 downwardly, carrying the actuating end member K$^b$ into operative position, it being subsequently turned by turning the key carrying with it the barrel. In some cases it may be necessary to preliminarily turn the end member K$^b$ through a given angle and past an obstructing part before reaching its initial position, as where one of the actuating elements 253, 254 has been turned from the opposite side, out of proper position relative thereto. To effect this result I provide a duplicate pair of recesses 275 in the side edges of the key so that the key may be partially extracted until the end recesses engage the tumblers 273 when the barrel may be turned as before, but simultaneously the shank and its end member K$^b$ are retracted sufficiently to avoid interference by the obstructing part. After it has been turned past such part the key K$^b$ may be pushed in full length to restore the end member K$^b$ to operative position, from which it may be subsequently turned to actuate the locking mechanism in the manner desired. If it is desirable to further provide against tampering with the locking mechanism, an additional pair or additional pairs of recesses, each pair preferably of a different depth from that of the other pairs, with corresponding detent mechanisms, may advantageously be provided in the key and barrel respectively.

It will be observed that my lock and latch system differs essentially from the conventional systems in that it locks the car to the door, as it were, rather than the door to the car, and the arrangement has the distinct advantage over the conventional systems that it is impossible for the latch 60 to become disengaged or pulled out of its latch plate socket when the car body is employed. Moreover, my locking elements 250, 251 when in locking position positively preclude the untoward opening of the doors even in the case of greatest strain due to accident or otherwise.

Where the car construction permits, it is obvious that the key grooves $m''$, $n''$ may be located in the faces of the locking elements 250, 251, operable from either the inside or outside of the car.

My system may, for instance, be adapted to the usual arrangement in which a body panel or post intervenes between the doors, as shown in Figs. 20 and 21. Here, I conveniently provide actuating elements 253', 254' at an elevation intermediate the sliding latches 74. The intermediate panel or post is provided with passages 276, 277 in which slide connecting rods 278, 279 pivoted at their inner ends respectively to the actuating elements 253', 254' and carrying as offsets at their opposite ends locking pins or bolts 280, 281 adapted when the actuating elements 253' and 254' are operated by the key K''' to slide into the recesses 282, 283 in the respective latch members 74 and thereby lock them against retraction. A key-hole 284 is provided in the body panel or post between the latches which latter are shown as at different vertical heights and if desired, the space between them may be increased to permit of the use of the key barrel extension mechanism shown in Fig. 18.

In Figs. 23 to 27, I have shown a further modified form of lock member 290 provided with lock bolts 290', 290'' of different length, adapted to engage recesses 74$^a$, 74$^b$ in door latches 74' and 74'' which in turn engage keepers 72$^a$, 72$^b$ in body post 72'' intervening between the doors, the inner side 72''' of the post being conveniently formed as a separate plate preferably removably attached in an appropriate manner to the main portion of the post to permit ready assembly of the locking mechanism. The locking mechanism, proper, is advantageously contained within a lock casing 291, provided with a removable side 291', and a top 291'' provided with apertures, as shown, for passage of the lock bolts 290' and 290''. The lock member or plate 290 slides in guides 291''' on opposite sides of the casing and is provided with an aperture 290''' having biasing recesses 290$^a$, 290$^b$, and 290$^c$ adapted to be engaged by cam or key member 292' on key shaft 292, operable by handle 292'', from within the car, or by a key 293' applied to the key-barrel 293, from without the car, as in Fig. 1. In order to permit sufficient extension of the latches 74' and 74'' for the accommodation of the recesses 74$^a$ and 74$^b$, the keepers 72$^a$, 72$^b$ are advantageously spaced narrower than customary, their outer ends at the points 72$^c$ and 72$^d$ lying well within the sides of the outer extension or part 72$^e$ of the post, and in lieu of the usual separate keepers screwed onto the post, they may conveniently be cast into a single piece secured to the post by a bolt passing through the casting and post as shown in Fig. 25. This construction is particularly convenient for a post terminating at or near the top of the front seat back, as in convertibles. It is obvious, however, that if the post extends to the top of the car, the same results may be achieved by merely narrowing the outer part 72ᵉ of the post to a width corresponding to the points 72ᶜ and 72ᵈ and screwing separate keepers on each side thereof, thus retaining the integrity of the post.

The lock members 290 on opposite sides of the car are shown in Figs. 23, 24 and 27 interconnected to operate in synchronism by means of an incompressible fluid transmission comprising pistons 294 rigidly attached to the lock members; cylinders 295, advantageously rigidly attached to the bottom of the casings 291, in which the pistons reciprocate; and fluid transmission tube 296, conveniently having its ends screwed into the bottom of the cylinders and containing an incompressible fluid 296'. The cylinder on one side may be inverted as shown on the left in Fig. 27 in order that motion in the same directions may be imparted to both opposite locking members 290, but it is obvious that if the locking member on the left is itself inverted to operate in the reverse direction to that on the right and is located above the latch, the corresponding cylinder need not be inverted. Springs 296ᵃ are provided to neutralize the effect of gravity and friction on the transmission system, the springs being placed in greater tension in compressed position to give initial impulse to the lock member. This system is quite flexible since it permits motion to be transmitted around curves and bends without appreciable friction, thus enabling the tube 296 to be located in the most convenient positions. Moreover, the number of branches and therefore the number of locks served may be multiplied as desired thus enabling all locks in the car to be operated from a single key.

In Figs. 23, 25 and 26 is shown means to prevent operation of the locks if any of the doors are open, said means comprising a detent 297 pivoted at 297' to the underside of the top 291" of the casing, said detent normally swinging vertically by gravity in the path of the lock member 290. The detent is provided with a beveled top 297" passing through a slot in the casing top into the path of the similarly beveled latch 74" so that when the latter moves behind its keeper 72ᵇ, the detent will be cammed by engagement of the respective beveled surfaces out of the path of the lock member 290. Since each latch is provided with a corresponding detent, it is obvious that if any one (or more) door is unlatched, its detent will not be lifted and the entire interconnected system will be prevented from operating until all doors are closed.

While I have shown a gravity detent in Figs. 23, 25, and 26, it is obvious that any other latch or door-controlled detent such as a spring biased detent or other preventive means may be employed to block the path of any of the locks disclosed herein until all the doors are properly closed.

In the operation of the system of Figs. 23 to 27, if all of the doors are closed and the detents 297, accordingly, moved by the latches out of the paths of the lock members 290, as shown at the left in Fig. 23, a key 293' (Fig. 24) inserted in key-barrel 293 and turned clockwise will operate the key shaft 292 and cam 292' (Fig. 23) to move the latter from its seat 290ᵃ and into engagement with the seat 290ᵇ, imparting a limited motion to the lock member 290 until the final position in said seat is reached, whereupon the bolts 290' will have moved into engagement with the recess 74ᵃ and locked the rear doors, while the bolts 290", of shorter length, will not yet have reached the recesses 74ᵇ to lock the front doors. If it is desired to lock the latter also, continued movement of the key in the same direction will further lift lock members 290 until the cam rests in seat 290ᶜ carrying the shorter bolts 290" into engagement with the latch recesses 74ᵇ, locking all doors. It will of course be understood from the diagrammatic showing in Fig. 27 that any motion imparted by the key to locking member 290 on the right will be exactly duplicated for the locking member 290 on the left, since the piston displacements on both sides are equal and the incompressible fluid transmits the motion without modification.

The cam member 292' when positioned in one of the seats 290ᵃ, 290ᵇ, or 290ᶜ maintains the locking member 290 and its bolts in the corresponding position, until moved by the inside handle 292" or by the key on the outer side. However, if desired, yieldable spring detents, for instance, similar to those shown in Figs. 1 and 13, may be employed to exactly position the lock member 290 in each of its three critical positions.

This system can also be readily adapted to operation from either side, or within the car, regardless of the point of the previous operation, by replacing the cam member 292' by a removable key, operating directly on the locking member 290, in the manner of the cam member. If desired, the key extension of Fig. 18 can be adapted thereto for this purpose, a similar arrangement also being substituted for the handle 292" and its shaft, to permit operation from within the car.

It is also obvious that the fluid system of transmission is directly applicable to the locking system of Fig. 7 since all that is required is to connect the racks 237' of the latter figure directly to the pistons 294 without inverting the left piston, since the rack 237' on the left in Fig. 7 is itself reversed from the position of the rack on the right and will therefore effect synchronous operation of the locks by the same direction of motion.

In Fig. 27ᵃ is shown how the tube enclosed wire 296ᵐ, as in Fig. 7, may be employed in a system of the character shown in Fig. 27, as the interconnecting means between the locks on opposite sides of the car to effect their simultaneous operation, and in Fig. 27ᵇ is diagrammatically shown how the fluid system of Fig. 27 may be extended to operate locking mechanisms on non-adjacent free edges of two doors on the same side of the vehicle.

In Fig. 28 is shown a lock member 290ᵘ provided with a dovetail groove to receive the tongue of an adjustable lock bolt 290ᵛ whereby the distance between the respective lock bolts may be adjusted. This is of particular utility in adjusting the new lock to old cars with varying widths of posts.

In Fig. 29 is shown a modified form of locking bolt 290ʷ, circular in cross section, and adapted to enter a circular hole 290ˣ in the bottom of the latch, as shown in dotted lines.

In Fig. 30 is shown a further modification in which the adjacent bolts are combined into a single bolt 290ʸ of V-shape, flattened at its base, the respective legs taking into relatively shallow partial V-shaped slots 290ᶻ in the bottoms of the adjacent latches.

While for purpose of illustration, I have shown particular forms of transmission mechanisms, applied to particular forms of locking mechanisms, it will be obvious that each may be adapted to the other in any combination most suitable to the particular situation.

It will be observed that in all of the disclosed systems I have reduced to a minimum both the frictional and the gravitational forces in opposition to the small force impressed upon the system by the key. This is highly essential to key operation of such systems since the resistance of weight and friction in a system having a tortuous path and subject to twists, strains and vibrations would otherwise render such key operation impossible. In certain of the disclosed systems this is accomplished by employing rotational or oscillatory motion of light members; in others, by balancing one vertically movable light element against another similar element movable only in opposite directions to the first whereby the resultant weight to be overcome by the key is zero; or by the use of supplemental counterbalancing springs. Frictional resistance is reduced by the light weight of the mechanical parts employed which is made possible by enclosing the mechanism in protective casings, or by the use of other expedients to prevent lateral displacements, whereby the very long and light members of the system are subjected only to tensile and compressive stresses to prevent them from kinking and breakage and to shield them from dislocations due to distortions, vibrations and strains in service. These and other expedients herein indicated, or inherent in the systems disclosed, have made it possible to obtain practical locking systems provided with mechanical interconnections between the locks on opposite sides of a vehicle which are sufficiently sensitive to be operable by a small pocket key, or the like, and sufficiently small in cross-section to permit the mechanical interconnections to be installed in the limited space available in the car body structure, since the interconnections must extend from the lock near the center of the middle post on one side, through the post to the floor, or the like, across the car, and up the middle post on the opposite side to the lock thereon, the posts being small in cross-section and usually curved longitudinally. The disclosed systems are, at all times, of sufficient strength and reliability to withstand the severe conditions imposed upon them in normal service.

By the expression "mechanical means" I mean to include all such physical means as solids, fluids, etc., commonly known as matter.

In accordance with the requirements of the patent statutes, I have disclosed the best modes contemplated by me of applying the fundamental principles of my invention, but I do not wish to be limited to the particular modes given as illustrative examples but aim to cover all equivalent modes, both as to the combinations and as to the sub-combinations disclosed.

I claim:

1. In a motor vehicle provided on each of its sides with a door and a latch therefor, in combination, locking means on each side of the vehicle for preventing withdrawal of said latches, mechanical interconnecting means between said locking means, and secret lock means for moving said locking and interconnecting means to lock or unlock said latches.

2. In a motor vehicle provided on each side with a door in combination: a latch for each door, provided with a recess; a locking pin on each side of the vehicle adjacent each recess; interconnecting means between said locking pins to cause them to move in synchronism; and secret lock means accessible from a point on the exterior of the vehicle adjacent one of said latches for operating one of said locking pins and, through the latter, said interconnecting means to operate said other locking pin.

3. In a motor vehicle provided on its opposite sides with a door and a door-handle operated latch, in combination, locking means for each latch which when in operative position prevents withdrawal of its corresponding latch, interconnecting means between said locking means comprising a longitudinally movable incompressible connection between said locking means, and secret lock means for operating said locking and interconnecting means, to lock and unlock said latches in a single operation.

4. In a motor vehicle provided with doors and door-handle operated latches, in combination, locking means for preventing withdrawal of said latches, interconnecting means between said locking means comprising a fluid pressure transmitting conduit between said locking means, and secret lock means for operating said locking and interconnecting means to lock and unlock said latches in a single operation.

5. In a motor vehicle provided on each side with a body post, a door and a latch therefor having a lock engageable portion, in combination, locking means for preventing withdrawal of said latches comprising a pin movable in the body post adjacent the free edge of each door to engage and disengage said engageable portion of said latch, and mechanical interconnecting means between said locking means.

6. The combination defined in claim 5 in which said interconnecting means comprises a fluid transmitting medium for transmitting the force applied to one pin to the other pin for synchronous operation of said pins.

7. In a motor vehicle provided on its opposite sides with doors having their free ends adjacent each other and latches therefor, in combination, a reciprocable lock member for each side of the vehicle carrying at two opposite corners vertical pins adapted to engage portions of the ends of the corresponding latches to prevent withdrawal of the latches of adjacent doors, at least one of said lock members having a portion engageable by a secret actuating means for reciprocation of said member, to lock and unlock said latches on one side of the vehicle, and interconnecting means between the lock member for one side of the vehicle and that for the other to effect simultaneous operation of both said lock members.

8. In a locking system employing, a pair of doors, with a jamb disposed between the doors, a latch bolt in each door, said latch bolts adapted to project into the jamb when the doors are closed, a dead locking member mounted in the jamb and engageable with the latch bolts to secure them against retraction, means for moving the dead locking member into or out of engagement with the latch bolts, and means for rendering the dead locking member inoperative if one of the latch bolts has been retracted from the jamb.

9. In a locking system employing, a pair of doors, with a jamb disposed between the doors, a latch bolt in each door, said latch bolts adapted to project into the jamb when the doors are closed and each latch bolt having a notch formed therein, a dead locking member mounted in the jamb and engageable with the notches in the latch bolts to secure them against retraction, means for moving the dead locking member into or out of engagement with the notches in the latch bolts, and a pair of members mounted in the path of movement of the latch bolts and adapted to be engaged thereby when the latch bolts are projected into the jamb, said members dogging the dead locking member against movement and rendering it inoperative if one of the latch bolts has been retracted from the jamb.

10. In a locking system employing a door and a jamb, a latch bolt in the door, said latch bolt adapted to be projected into the jamb when the door is closed, a dead locking member mounted in the jamb and engageable with the latch bolt to secure it against retraction, remote control means for moving the dead locking member into or out of engagement with the latch bolt, and means for rendering the remote control means inoperative if the latch bolt has been retracted from the jamb.

11. In a locking system employing a door with a jamb, a latch bolt in the door, said latch bolt adapted to project into the jamb when the door is closed, a dead locking member mounted in the jamb and engageable with the latch bolt to secure it against retraction, remote control means for moving the dead locking member into or out of engagement with the latch bolt, and a member mounted in the path of the latch bolt and adapted to be engaged thereby when the latch bolt is projected into the jamb, said member rendering the remote control means inoperative if the latch bolt has been retracted from the jamb.

12. In a locking system employing a plurality of locks and one of said locks being a master lock, manually operated means for actuating the master lock, means operated by said manual means for locking the other locks, and means for rendering said manual means inoperative if any lock fails to operate.

13. In a locking system employing a plurality of locks and one of said locks being a master lock, key actuated means for actuating the master lock, means actuated by the key mechanism for operating the other locks, and means for rendering the key mechanism inoperative if any lock fails to operate.

14. In a locking system employing a plurality of locks and each lock having a latch bolt, dogging means cooperating with each lock to dog the latch bolts against retraction when projected, manually actuated means for simultaneously releasing or dogging the several latch bolts, and means for rendering said manual means inoperative if one of the latch bolts assumes a retracted position.

15. The combination as defined in claim 7 in which the reciprocable members are plate members and the interconnecting means is a flexible tube-enveloped wire directly attached at its respective ends to said plate members.

16. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is locked, and means associated with another of said locks and operable by a predetermined pressure in said pressure means and adapted for locking said other lock.

17. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is unlocked, and means associated with another of said locks and operable by a predetermined pressure in said pressure means and adapted for unlocking said other lock.

18. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is operating, and means associated with another of said locks and operable by a predetermined pressure in said pressure means and adapted for operating said other lock.

19. The combination comprising a locking bolt, mechanical, non-fluid, hand operated means for operating said bolt, a receptacle, fluid in said receptacle, an element associated with said receptacle and movable by said bolt, when said bolt is brought to locking position, to change the pressure of said fluid, and a second element associated with said receptacle and adapted, under the changed pressure, to change position and in the changed position to act as a locking element.

20. The combination comprising locking means, mechanical, non-fluid, hand-operated means for motivating said locking means, a receptacle having a movable wall, said wall being movable by said locking means, said receptacle having a second movable wall, a fluid in said receptacle adapted for transmitting pressure between said walls, a second locking means, and means operable by the motion of said second wall for locking said second locking means.

21. The combination comprising locking means, mechanical, non-fluid, hand-operated means for motivating said locking means, a receptacle having a movable wall, said wall being movable by said locking means, said receptacle having a second movable wall, a fluid in said receptacle adapted for transmitting pressure between said walls, a second locking means, means operable by the motion of said second wall for locking said second locking means, and resilient means between said walls and a fixed portion of said receptacle.

22. The combination comprising locking means, mechanical, non-fluid, hand-operated means for motivating said locking means, a receptacle having a movable wall, said wall being movable by said locking means, said receptacle having a second movable wall, a fluid in said receptacle adapted for transmitting pressure between said walls, a second locking means, means operable by the motion of said second wall for locking said second door, said receptacle being between the first and second mentioned locking means.

23. In a motor vehicle having a door and a second door, the combination with said doors of locking means associated with said first door, mechanical, non-fluid, hand-operated means for motivating said locking means, a receptacle having a movable wall, said wall being movable by said locking means, said receptacle having a second movable wall, an incompressible fluid in said receptacle and adapted for transmitting a motion of said first wall to said second wall, and means associated with said second wall and adapted, at a predetermined position of said second wall, for locking said second door.

24. In a motor vehicle having a door and a second door, the combination with said doors of locking means associated with said first door, mechanical, non-fluid, hand-operated means for motivating said locking means, a receptacle having a movable wall, said wall being movable by said locking means, said receptacle having a second movable wall, a fluid in said receptacle adapted for transmitting pressure between said walls, locking means associated with said second door, means operable by the motion of said second wall for locking said second door, resilient means associated with said walls, said receptacle having two separate portions connected by a conduit, said walls and respectively associated resilient means being respectively associated with said portions.

25. In a motor vehicle having a door and a second door, the combination with said doors of a locking bolt associated with said first door, mechanical, non-fluid, hand-operated means for locking said door, a receptacle associated with said motor vehicle, a piston in said receptacle biased to a predetermined position by a spring and movable by said bolt whereby the pressure in said receptacle is changed, a second piston in said cylinder and held in one position by a spring when the pressure in said cylinder has a predetermined value and movable to another position when there is a different pressure in said receptacle, and a locking bolt associated with said second piston and adapted for locking said second door when said second piston is in said other position.

26. In a motor vehicle having a door and a second door, the combination with said doors of a locking bolt associated with said first door, mechanical, non-fluid, hand-operated means for locking said door, a receptacle associated with said motor vehicle, a piston in said receptacle biased to a predetermined position by a spring and movable by said bolt whereby the pressure in said receptacle is changed, a second piston in said cylinder and held in one position by a spring when the pressure in said cylinder has a predetermined value and movable to another position when there is a different pressure in said receptacle, and a locking bolt associated with said second piston and adapted for locking said second door when said second piston is in said other position, said last-mentioned spring being adapted to bias said second piston to said one position when said first piston is released from the action of said first bolt.

27. In a motor vehicle having a door and a second door, the combination with said doors of a locking bolt associated with said first door, mechanical, non-fluid, hand-operated means for locking said door, a receptacle associated with said motor vehicle, a piston in said receptacle biased to a predetermined position by a spring and movable by said bolt whereby the pressure in said receptacle is changed, a second piston in said cylinder and held in one position by a spring when the pressure in said receptacle has a predetermined value and movable to another position when there is a different pressure in said receptacle, and a locking bolt associated with said second piston and adapted for locking said second door when said second piston is in said other position, said pistons being in different portions of said receptacle, said portions being separated by a connecting conduit.

28. In a vehicle construction comprising a vehicle body having a plurality of doors; locks for said doors; means causing actuation of one of said locks to effect concurrent operation of the other locks; and means preventing the operation of any of said locks until all of said doors are closed.

29. In a vehicle provided with adjacent doors, in combination, latches for said doors, and a movable member engaging one of said latches to prevent its retraction when said movable member is moved to one position, and engaging both of said latches to prevent their retraction when said movable member is moved to a second position.

30. In a vehicle provided with adjacent doors, in combination, latches for said doors; and means operable by a secret lock means, when said lock means is in one position, to prevent retraction of one of said latches, and, when said lock means is in a second position, to prevent retraction of both of said latches.

31. In a vehicle body provided with pairs of doors on each side, the members of each pair being separated by a fixed body post, in combination, a single locking element carried by the fixed body post, on each side, movable to directly lock or unlock both doors adjacent thereto, and a longitudinally movable incompressible means connecting said locking elements.

32. The combination defined in claim 31 in which the incompressible means is a fluid.

33. The combination defined in claim 31 in which the incompressible means is a tube enclosed wire.

34. In a vehicle body provided with pairs of doors, on each side, in combination, locks for said doors, at least one of which is adapted to be actuated from outside the vehicle by a secret lock means and an incompressible fluid medium interconnecting all of said locks and operable by said one lock to operate said other locks.

35. In a vehicle provided with a body post, doors having adjacent free ends on opposite sides of said post, and latches for said doors having lock engageable portions within said post, in combination: a uniplanar lock plate vertically reciprocable within said post and provided adjacent each opposite corner of one of its horizontal ends with a narrow projection extending in a vertical direction in the plane of said plate and adapted in one position to engage the said lock engageable portion of the adjacent latch, to prevent its withdrawal and in another position to permit such withdrawal.

36. In a motor vehicle provided with a body post, doors having adjacent free ends on opposite sides of said post, and latches for said doors having lock engageable portions within said post, in combination: a uniplanar lock plate vertically reciprocable within said post and provided adjacent each of the two opposite corners of one of its horizontal ends with a narrow vertical extension lying in the plane of said plate and adapted to engage the engageable portion of the corresponding latch, said plate having a portion for effecting its vertical reciprocation by secret locking mechanism.

37. In a motor vehicle provided with a door on each side, locking means for said doors, interconnecting means between said locking means comprising a tube and a flexible wire therein between the respective locking means and adapted to actuate the same, each end of said wire terminating in a rigid longitudinal member of greater cross-sectional area than the intermediate flexible portion thereof adapted to slide in the corresponding end portions of the tube to prevent buckling of said wire when it is extended beyond one of the ends of said tube, said rigid members and the corresponding end portions of the tube through which said rigid members pass being contoured to prevent twisting or turning of said members when reciprocated.

38. In a vehicle provided with a body post, doors having adjacent free ends on opposite sides of said post, and latches for said doors having lock engageable portions within said post, in combination: a uniplanar lock plate vertically reciprocable within the post and provided adjacent each opposite corner of one of its horizontal ends, with a narrow projection extending in a vertical direction in the plane of said plate and adapted in one position to engage the lock engageable portion of the adjacent latch, to prevent its withdrawal, and in another position to permit such withdrawal, one of said projections being horizontally adjustable.

39. In a vehicle provided with a body post, doors having adjacent free ends on opposite sides of said post, and latches for said doors having lock engageable portions within said post, in combination: a uniplanar lock plate vertically reciprocable within the post and provided adjacent each opposite corner of one of its horizontal ends, with a narrow projection extending in a vertical direction in the plane of said plate and adapted in one position to engage the lock engageable portion of the adjacent latch, to prevent its withdrawal, and in another position to permit such withdrawal, one of said projections being of greater length than the other to cause only one of the doors to be locked upon a partial vertical movement of said plate.

40. In a vehicle provided on each side with a door, in combination; locks for said doors; means for connecting the lock on one side of the vehicle to the lock on the other side of the vehicle, said connecting means comprising a vertical connector for each side of the vehicle connected at its upper end to its corresponding lock; a horizontal connector between the lower ends of said vertical connectors; and a pivoted bell-crank lever between the lower ends of the respective vertical connectors and the corresponding adjacent ends of said horizontal connector to transmit movement imparted to one of said vertical connectors to the other of said vertical connectors to operate said respective lock means in synchronism.

41. In a vehicle provided on each side with a door, in combination: locks for said doors; means for connecting the lock on one side of the vehicle to the lock on the other side of the vehicle, said connecting means comprising a vertical connector for each side of the vehicle connected at its upper end to its corresponding lock, a horizontal connector between the lower ends of said vertical connectors and means between the respective ends of said vertical and horizontal connectors to cause one of said vertical connectors to move in the opposite vertical direction to that of the other vertical connector, to balance the weight of one of said vertical connectors against that of the other when the lock system is operated, to transmit movement imparted to one of said vertical connectors to the other of said vertical connectors to operate said respective lock means in synchronism.

42. In a vehicle body provided with a plurality of doors, in combination: a lock element individual to each door, one of which elements is operable from the exterior of the vehicle by a secret locking means, and fluid transmitting means interconnecting said lock elements and operable by said one lock element to operate another of said lock elements.

43. The combination defined in claim 37 in which each end portion of the tube through which one of said rigid members passes is provided with a longitudinal slot extending through the corresponding end of the tube, the corresponding rigid member being located in and slidable in said slot.

44. In a motor vehicle provided with a body post, doors having adjacent free ends on opposite sides of said post, and latches for said doors having lock engageable portions within said post, in combination: a uniplanar lock plate vertically reciprocable within said post and provided adjacent each of the two opposite corners of one of its horizontal ends with a narrow vertical extension lying in the plane of said plate adapted to engage the engageable portion of the corresponding latch, said lock plate being provided with an opening whose periphery is engageable by an actuating means to effect reciprocation of said member.

45. In a vehicle provided with a body post, doors having adjacent free ends on opposite sides of said post, and latches for said doors having lock engageable portions within said post, in combination: a uniplanar lock plate vertically reciprocable within said post and provided adjacent each opposite corner of one of its horizontal ends, with a narrow projection extending in a vertical direction in the plane of said plate and adapted in one position to engage the said lock engageable portion of the adjacent latch to prevent its withdrawal, and in another position to permit such withdrawal, said plate being provided on its horizontal end opposite said first mentioned end, with a projection for attachment to interconnecting means between pairs of door locks on different parts of a vehicle.

46. The combination defined in claim 37 in which the doors are provided with latches and the locking means comprise a locking element for each latch operatively connected respectively to the opposite ends of the interconnecting means and movable therewith in one direction to engage their respective latches to prevent retraction of the latter and in the opposite direction to release said latches and permit their retraction.

RICHARD E. MARINE.